US009813911B2

(12) United States Patent
Kong et al.

(10) Patent No.: US 9,813,911 B2
(45) Date of Patent: Nov. 7, 2017

(54) METHODS AND SYSTEMS FOR MONITORING COMPUTING DEVICES ON A VEHICLE

(71) Applicant: Panasonic Avionics Corporation, Lake Forest, CA (US)

(72) Inventors: Jason Kong, Lake Forest, CA (US); Michael Dierickx, Lake Forest, CA (US); Phillip Watson, Lake Forest, CA (US); Justin Vaicaro, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 36 days.

(21) Appl. No.: 14/962,425

(22) Filed: Dec. 8, 2015

(65) Prior Publication Data

US 2017/0164199 A1    Jun. 8, 2017

(51) Int. Cl.
*H04M 1/66* (2006.01)
*H04W 12/08* (2009.01)
*H04B 1/3822* (2015.01)

(52) U.S. Cl.
CPC .......... *H04W 12/08* (2013.01); *H04B 1/3822* (2013.01)

(58) Field of Classification Search
CPC ........ H04W 12/12; H04W 12/06; H04L 63/08
USPC .......... 455/410–411, 418–420, 456.1–456.3, 455/457, 41.1–41.2, 569.2, 575.9
See application file for complete search history.

(56) References Cited

U.S. PATENT DOCUMENTS

| 7,237,264 B1 | 6/2007 | Graham et al. | |
| 7,962,957 B2 | 6/2011 | Keohane et al. | |
| 9,348,981 B1* | 5/2016 | Hearn | G06F 21/31 |
| 2003/0221123 A1 | 11/2003 | Beavers | |
| 2006/0187030 A1* | 8/2006 | Przygoda | G06K 17/00 340/539.13 |
| 2007/0006304 A1* | 1/2007 | Kramer | G06F 21/55 726/22 |
| 2007/0124427 A1* | 5/2007 | Light | G07C 9/00103 709/218 |
| 2009/0064326 A1* | 3/2009 | Goldstein | H04L 63/0227 726/22 |

(Continued)

FOREIGN PATENT DOCUMENTS

| EP | 2892200 | 7/2015 |
| WO | WO2014/142791 | 9/2014 |

OTHER PUBLICATIONS

"Identifying and Correlating Attack Indicators", Cisco Systems, Inc., http://www.cisco.com/web/about/security/intelligence/IDCorrAttackInd.html.

(Continued)

*Primary Examiner* — Dai A Phuong
(74) *Attorney, Agent, or Firm* — Klein, O'Neill & Singh, LLP (57) ABSTRACT

Methods and systems for a transportation vehicle are provided. As an example, one method includes monitoring a first set of networked devices located at a transportation vehicle and a second set of user devices that are controlled by users of the transportation vehicle; detecting a first parameter indicating a suspicious behavior by a user device; obtaining at least a second parameter associated with the user device; and correlating the first parameter and the second parameter to declare a security related event.

21 Claims, 8 Drawing Sheets

(56) References Cited

U.S. PATENT DOCUMENTS

| | | | | |
|---|---|---|---|---|
| 2010/0259359 | A1* | 10/2010 | Ishikawa | B60R 16/033 340/5.2 |
| 2013/0286859 | A1* | 10/2013 | Wei | H04L 43/10 370/244 |
| 2014/0274048 | A1* | 9/2014 | Lavi | H04W 48/04 455/435.1 |
| 2014/0323170 | A1* | 10/2014 | Chen | H04W 48/20 455/501 |
| 2015/0249494 | A1* | 9/2015 | Sela | H04W 48/20 455/435.1 |
| 2015/0319581 | A1* | 11/2015 | Dicke | G01C 21/362 455/457 |
| 2016/0019388 | A1 | 1/2016 | Singla et al. | |
| 2016/0088640 | A1* | 3/2016 | Huang | H04W 4/028 370/329 |
| 2016/0127344 | A1* | 5/2016 | Cox | H04L 63/0823 726/7 |
| 2017/0013005 | A1* | 1/2017 | Galula | H04L 63/1425 |
| 2017/0041145 | A1* | 2/2017 | Sinchak | G06F 21/6218 |
| 2017/0063852 | A1* | 3/2017 | Azar | G06F 21/32 |

OTHER PUBLICATIONS

*Security Configuration Guide: Securing User Services, Cisco IOS Release 15.0S*, Cisco Systems, Inc., 2010.

Gil Casals, et al., *Generic and Autonomous System for airborne networks cyber-threat detection*, $32^{nd}$ Digital Avionics Systems Conference, Oct. 8, 2013.

Mahmoud Mostafa, "Analysis of Security and QoS in Networks with Time Constraints", Thèse, Doctorat De L'Université de Toulouse, Nov. 10, 2011.

"DTI WISE AudioNideo Solution for KID Systeme", DTI Solutions, White Paper Revision 1.5., 2013.

Extended European Search Report from EPO dated Jan. 19, 2017 for European Application No. 16198911.6.

* cited by examiner

| Device Identifier 317 | Collected Data 320 | First Threshold Values 322 | Other Related Data 324 | Second Threshold Values 326 |
|---|---|---|---|---|
| Device 1 | Parameter 1 | $T_1$ | OP1 | $Th_1$ |
| ••• | ••• | ••• | ••• | ••• |
| ••• | ••• | ••• | ••• | ••• |
| ••• | ••• | ••• | ••• | ••• |
| Device N | Parameter X | $T_X$ | OPN | $Th_N$ |

METHODS AND SYSTEMS FOR MONITORING COMPUTING DEVICES ON A VEHICLE

COPYRIGHT NOTICE

A portion of the disclosure herein contains material to which a claim for copyrights is made. The copyright owner, the assignee of this patent application, does not have any objection to the facsimile reproduction of any patent document as it appears in the USPTO patent files or records, but reserves all other copyrights, whatsoever.

TECHNICAL FIELD

The present disclosure relates to monitoring networked computing devices and more particularly, to reducing security risks associated with the use of such computing devices.

BACKGROUND

Transportation vehicles, for example, aircrafts, trains, buses, recreation vehicle, boats and other similar vehicles use various computing devices for providing various functions, including entertainment content, control systems and others. These devices include hardware (for example, servers, switches, network interface cards, storage adapters, storage devices and others) and software (for example, server applications, operating systems, firmware, management applications, application programming interface (APIs) and others). As the use of computing devices continues to increase, so does the risk of unauthorized access and security breaches associated with these devices. Continuous efforts are being made to proactively monitor computing devices and identify security risks associated thereof.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), solid state memory device or any other storage device, in accordance with the claimed subject matter.

In one aspect, various methods and systems for a transportation vehicle are provided. As an example, one method includes monitoring a first set of networked devices located at a transportation vehicle and a second set of user devices that are controlled by users of the transportation vehicle; detecting a first parameter indicating a suspicious behavior by a user device; obtaining at least a second parameter associated with the user device; and correlating the first parameter and the second parameter to identify a potential security breach.

Figure 1A:
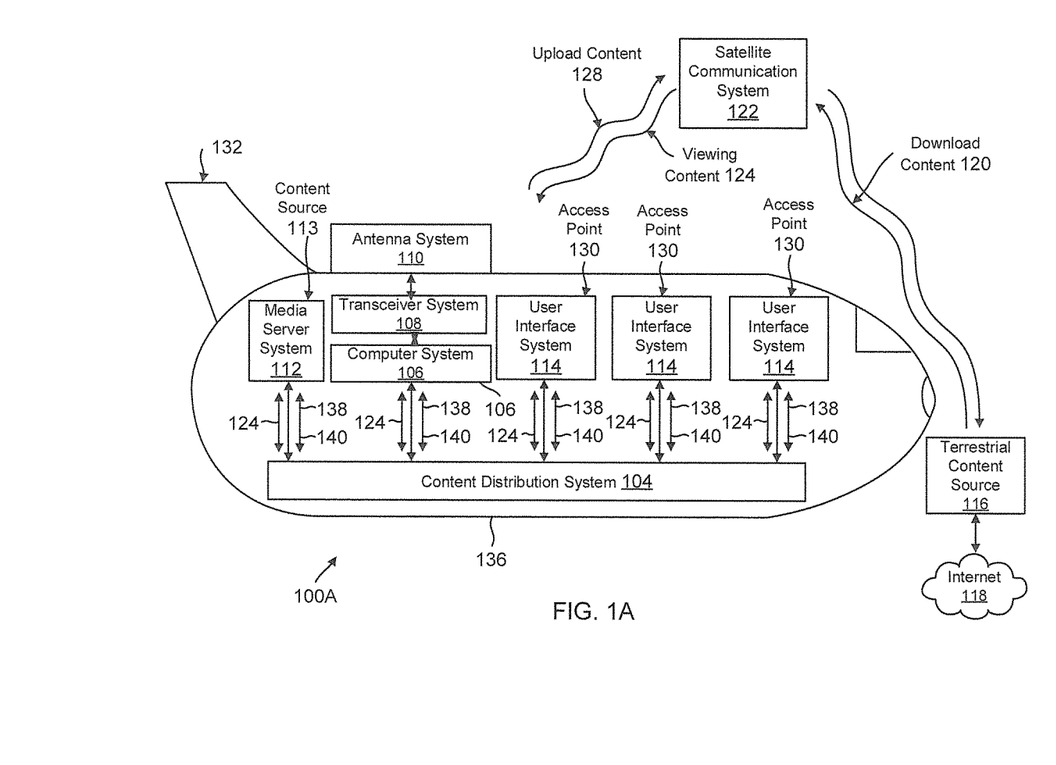
FIG. 1A shows an example of an operating environment for implementing the various aspects of the present disclosure in an aircraft.

Vehicle Information System: FIG. 1A shows an example of a vehicle information system 100A (also referred to as system 100A) that can be configured for installation aboard an aircraft 132, according to one aspect of the present disclosure. When installed on an aircraft, system 100A can comprise a conventional aircraft passenger in-flight entertainment (IFE) system, such as the Series 2000, 3000, eFX, and/or eX2 in-flight entertainment system as manufactured and provided by Panasonic Avionics Corporation (without derogation of any trademark rights of Panasonic Avionics Corporation) of Lake Forest, Calif.

System 100A comprises at least one conventional content source 113 and one or more user (or passenger) interface systems 114 that communicate with a real-time content distribution system 104. The content sources 113 may include one or more internal content sources, such as a media server system 112, that are installed aboard the aircraft 132 and/or one or more remote (or terrestrial) content source 116 that can be external from the aircraft 132. The media server system 112 can be provided as an information system controller for providing overall system control functions for system 100A and/or for storing viewing content 124, including pre-programmed viewing content and/or downloaded viewing content 120, as desired. Exemplary viewing content 124 can include television programming content, music content, podcast content, photograph album content, audiobook content, and/or movie content without limitation. The exemplary viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive download viewing content 120 from a selected terrestrial content source 116 and/or transmit upload viewing content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114, as desired. Although shown and described as being separate systems for purposes of illustration, the computer system 106 and the media server system 112 can be at least partially integrated.

The user interface system 114 may be computing terminals that are accessed via access point 130. The user interface system 114 provides a display device to view content. The user interface system 114 includes a hardware interface to connect to the access point 130 that provides a wired and/or a wireless connection for the user interface system.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, payment information likewise can be entered via the input system. The input system can be provided in any conventional manner and typically includes one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements. Details of the user interface system 114 are not germane and hence have not been provided herein.

Figure 1B:
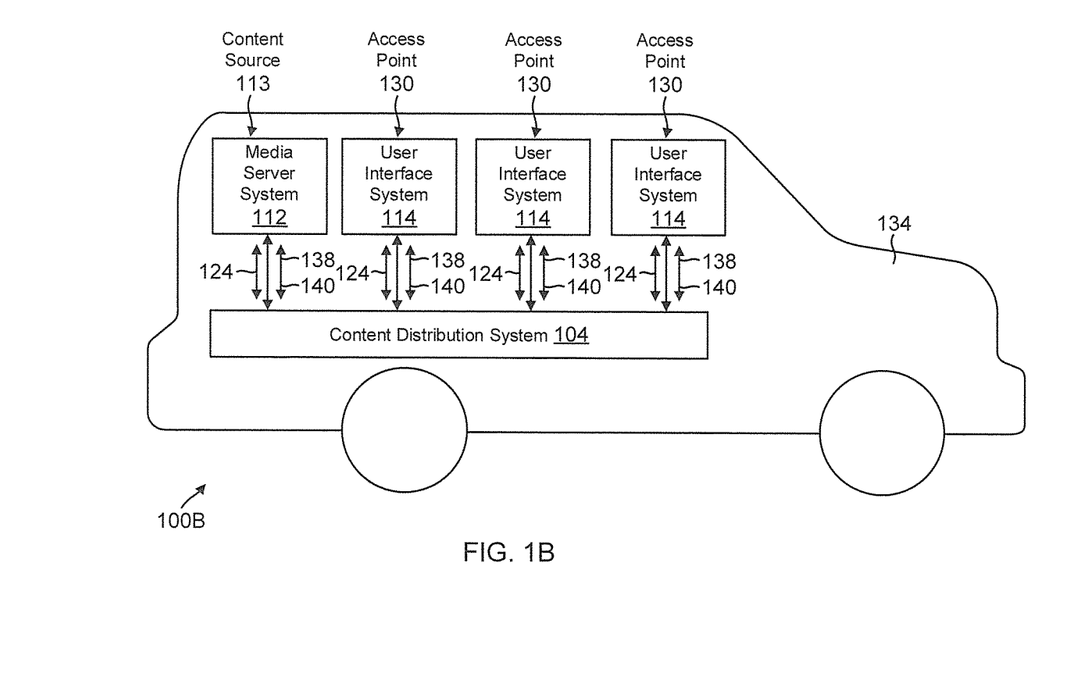
FIG. 1B shows another example of the operating environment at another vehicle, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
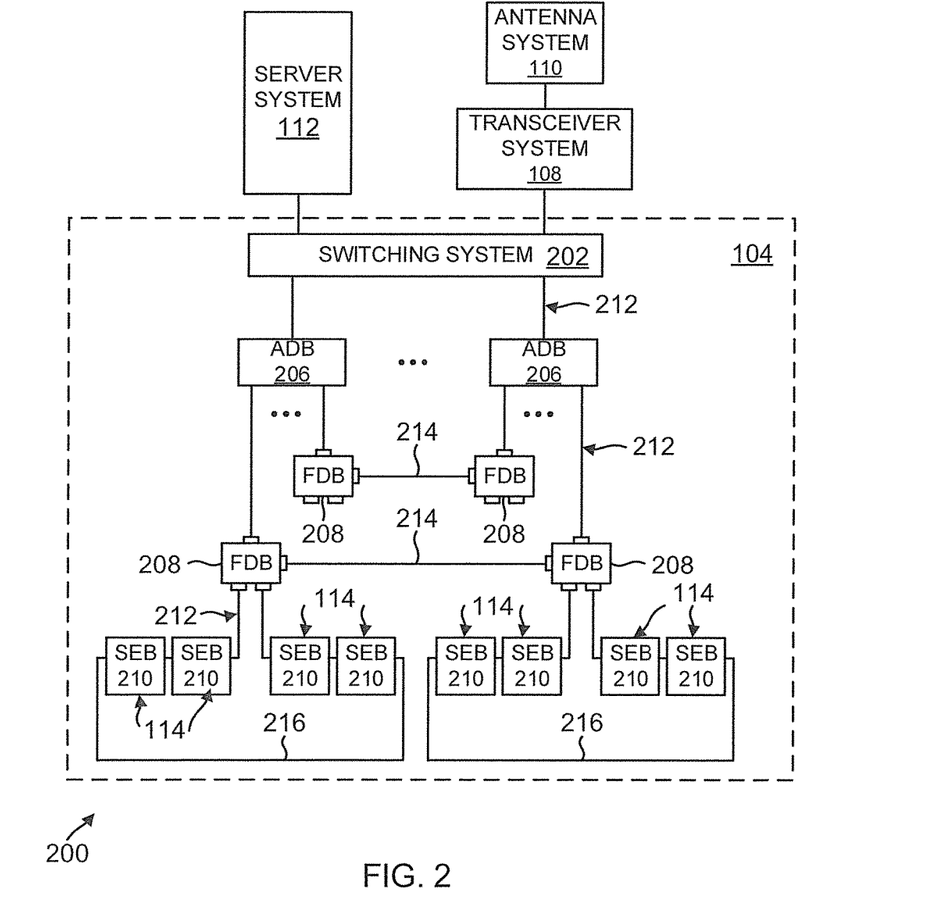
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

Figure 3A:
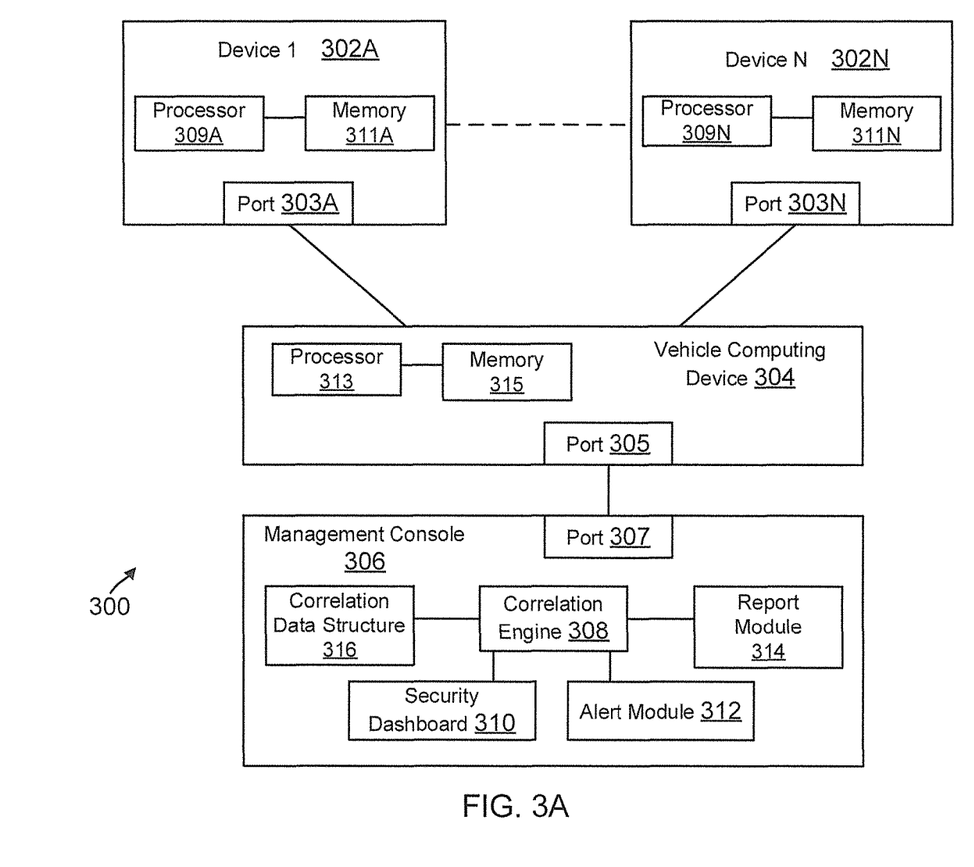
FIG. 3A shows an example of a system for monitoring computing devices of a vehicle, according to one aspect of the present disclosure.

Data Correlation System: FIG. 3A shows a block diagram of a system 300 that can be used on an aircraft or any other transportation vehicle, according to one aspect of the present disclosure. System 300 includes a plurality of monitored devices 302A-302N (may be referred to as a monitored device or monitored devices 302). The monitored devices 302 may include the various devices shown in FIGS. 1A, 1B and FIG. 2, including any user electronic devices that are being used in the vehicle, for example, when the vehicle is in transit i.e. when the aircraft is in the air or if a train or bus is in transit. The plurality of monitored devices include the user interface systems 114, access point 130, media server system 112, computer system 106, the content distribution system 104, other content sources and user computing devices that are coupled to or are attempting to connect to the various vehicle devices of FIGS. 1A-1B.

Each monitored device includes or has access to processing logic 309A/309N and a memory 311A/311N for executing programmed instructions. The instructions will depend on the function of the device at any given time.

Each monitored device also includes a communication interface or a port 303A-303N for sending and receiving data. The ports include logic and circuitry for enabling network communication. The ports may use one or more networking protocol, for example, Ethernet and others, for network communication. The port logic and circuitry is configured for enabling such network communication. The ports may be a part of network interface cards or other hardware devices configured for network communication.

Various data types are collected from the plurality of monitored devices by a vehicle computing device 304. For example, Internet Protocol (IP) address, Media Access Control (MAC) addresses and others. IP and MAC addresses are used for accessing networked devices.

Vehicle computing device 304 may be a stand-alone system or integrated with a computing entity of system 100A/100B. The vehicle computing device 304 includes processor or processing logic 313 with access to a memory 315. Memory 315 may be used to store instructions for processing data collected from devices 302A-302N. In one aspect, vehicle computing device 304 may be a secured, management console on the vehicle.

Collected data from the monitored devices may be provided to an offline, management console 306 that includes a processor executable, correlation engine 308. Management console 306 receives collected data from the vehicle computing device 304 via ports 305 and 307. The collected data is stored at a storage device (not shown). The correlation engine 308 uses the collected data for the monitored devices to generate a correlation data structure 316. The correlation data structure 316 may be used to identify potential security risks or suspicious events on the vehicle. The nature of the suspicious event will depend on the type of security risk, as described below in detail.

Figure 4A:
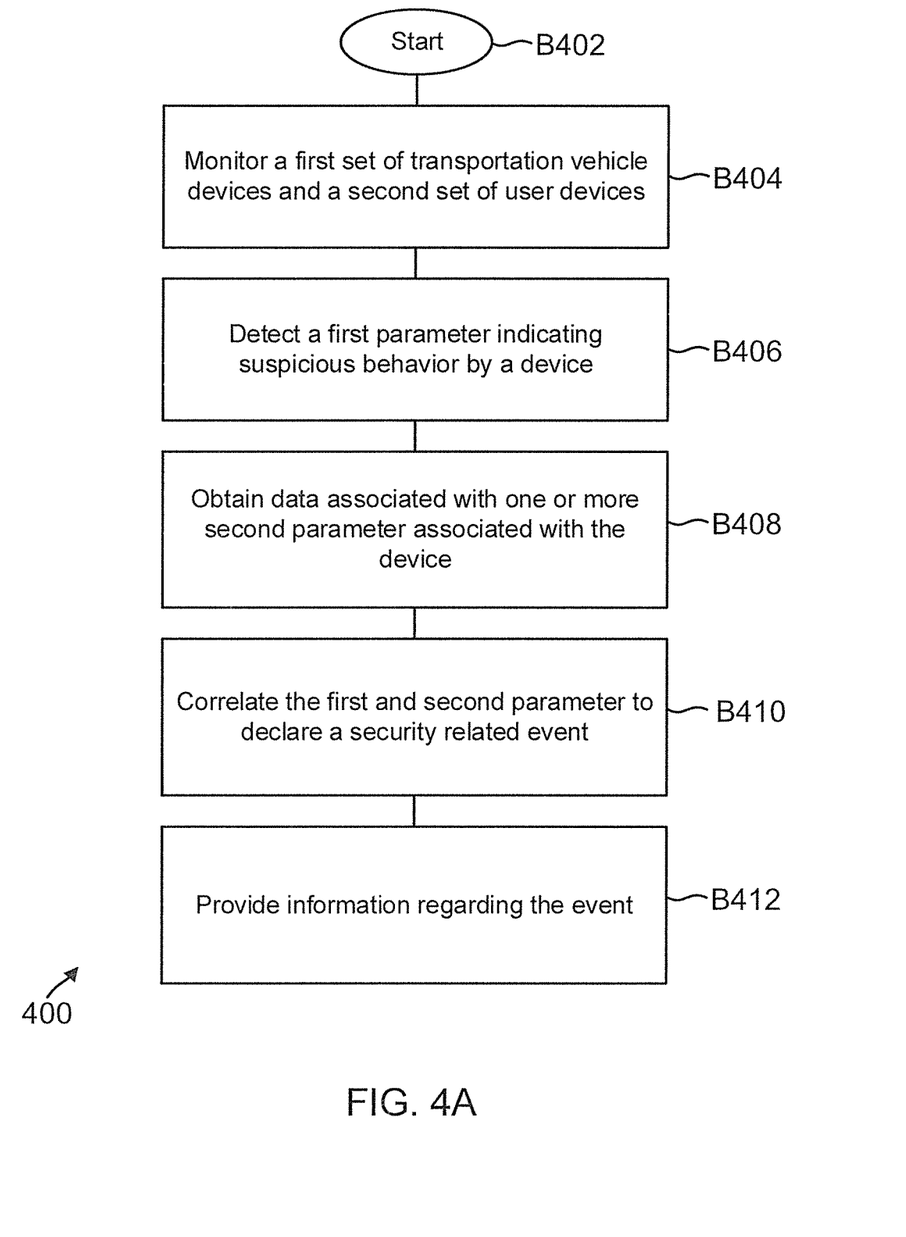
FIG. 4A shows a process for monitoring devices, according to one aspect of the present disclosure.
Figure 4B:
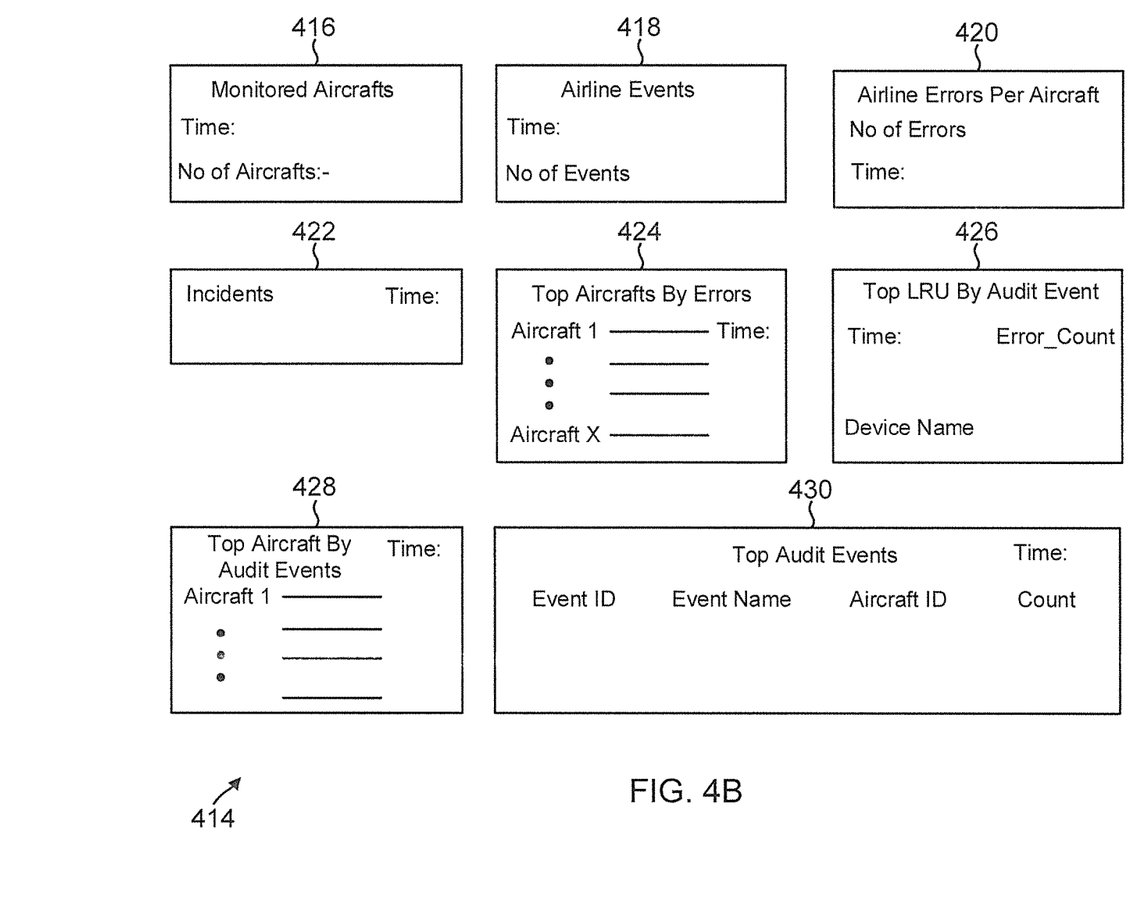
FIG. 4B shows an example of a screenshot provided by a management console, according to one aspect of the present disclosure.

In one aspect, the correlation engine 308 provides a security dashboard module 310 that displays a monitoring summary for the various monitored devices, as described below with respect to FIG. 4B. Based on the analysis of the collected data, an alert module 312 is used to trigger an alert for an appropriate entity. The nature of the alert will depend on the type of security breach and the severity of the breach. A reports module 314 provides reports involving device monitoring and any incidents that may be associated with the devices.

It is noteworthy that although the correlation engine 308 is shown at the offline, management console 306, it can be executed real-time, on the vehicle itself, for example at the vehicle computing device 304. The adaptive aspects of the present disclosure are not limited to any specific location for executing the correlation engine. In another aspect, the functionality provided by management console 306 and vehicle computing device 304 may be integrated into a single computing device or may be distributed among more than two systems, for example, using a cloud based architecture.

Figure 3B:
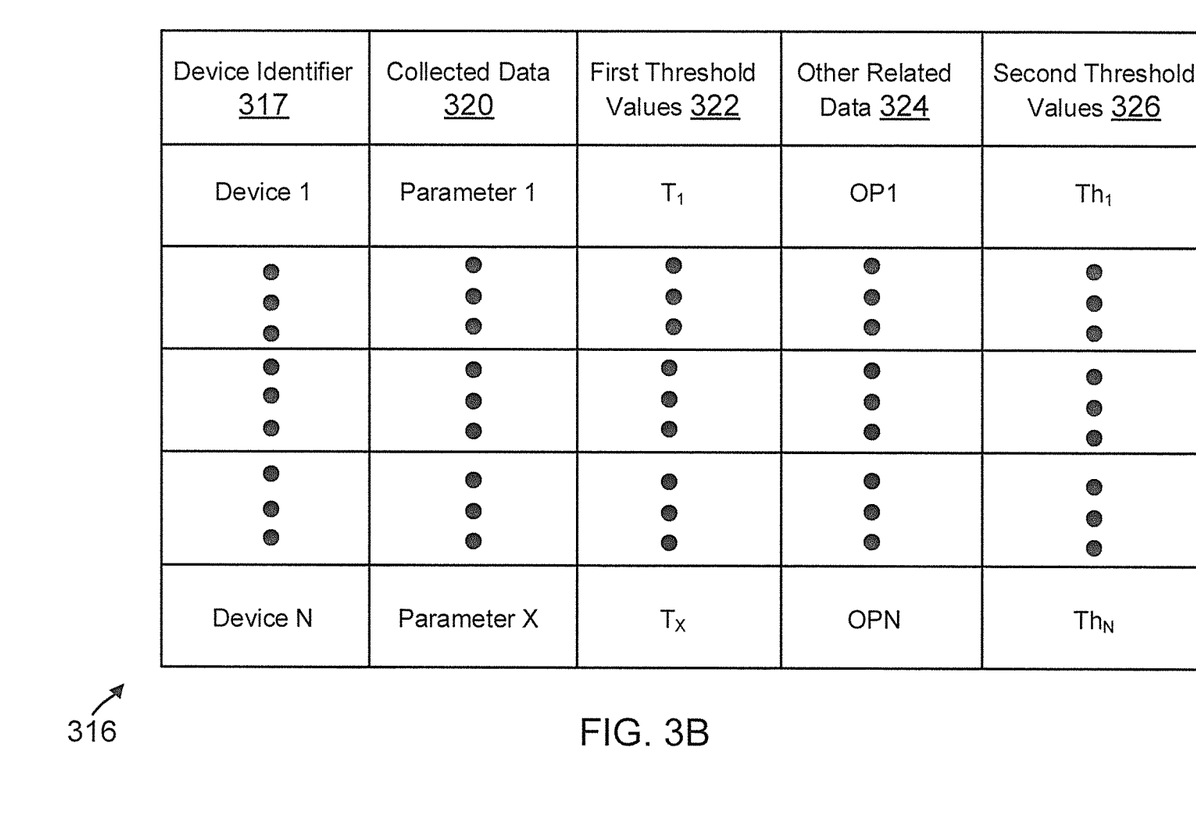
FIG. 3B shows an example of a data structure, used according to one aspect of the present disclosure.

Correlation Data Structure: FIG. 3B shows an example of the correlation data structure 316, according to one aspect. In one aspect, the correlation data structure 316 stores a device identifier 317 that uniquely identifies each monitored device whose data is collected. The collected data 320 (or a first parameter of the collected data) is compared with a first threshold value 322 to determine if the collected data indicates an acceptable device behavior or suspicious behavior. If the collected data indicates suspicious behavior then other data is evaluated to ascertain if the device is causing a security breach or if the device is impacted by a security breach. If the first parameter has reached the first threshold limit, then other related data (or a second parameter) 324 is evaluated and compared to a second threshold value, 326. The related data may be from an archive or collected real-time. If the second threshold value is also breached, then an incident may be declared by the alert module 312. The type of incident will depend on the type of collected data and the nature of the breach. As an alternative to a data structure, the data may be arranged in a database, table, a combination thereof, or some combination of a data structure, database, and table.

In one aspect, data collected for each device is treated like an object. An incident rule set is configured for the correlation engine 308 such that the correlation engine 308 can detect suspicious behavior, determine what other data to evaluate and then based on the overall evaluation declare an incident.

As an example, correlation engine 308 is configured to use different logs (not shown) to evaluate various data parameters for an event of interest (EOI). The term event means certain device behavior or a parameter value. The correlation engine 308 evaluates both the data parameters and the frequency of events before declaring an incident. In one aspect, the correlation engine 308 may assign different severity levels based on the frequency of the EOI within a certain time frame. The severity level may be "Level 0: Emergency, system not usable", "Level 1: Alert, action should be taken immediately", "Level 2: Critical, indicating a critical condition", "Level 3: Error, indicating an error condition", "Level 4: Warning, indicating a warning condition", "Level 5: Normal, indicating a normal but significant condition", "Level 6: Information", "Level 7: debug" and others. Of course, these severity levels are shown as an example and the various aspects described herein may be implemented with more and fewer severity levels. Examples of different events/incidents are provided below.

Process Flow: FIG. 4A shows a process 400 for monitoring networked devices and identifying potential security risks in a vehicle, according to one aspect of the present disclosure. The process begins in block B402. The process may start before a vehicle has started moving. As an example, when the vehicle is an aircraft, the process begins before the aircraft takes off and continues when the aircraft is in the air.

In block B404, a first set of devices of the vehicle and a second set of user devices that are being used within the vehicle are monitored. As an example, a user device may be a computing device/mobile device with a network port that attempts to scan one or more ports of the networked devices of the vehicle. In one aspect, data regarding the plurality of devices (i.e. the first set and the second set) is collected. As described above, the term port as used herein means an entity that includes logic and circuitry to communicate with other devices. Port logic typically depends on the network protocol type that is being used for network communication, for example, Ethernet, Wi-Fi protocols and others. The adaptive aspects described herein are not limited to any specific protocol or port type. In one aspect, the vehicle computing device 304 collects IP and MAC address of a device that is attempting to scan the vehicle device ports.

In block B406, the process determines if a first parameter indicates suspicious behavior. This may be ascertained by comparing the first parameter with a first threshold value stored at data structure 316, as described above. The threshold value depends on the data type and the event type. Based on the above example, when a device attempts to scan or login into the computing devices of the vehicle, then a number of login attempts or port scans may trigger a "suspicious" event for the correlation engine 308.

In block B408, other data (for example, a second parameter) associated with the device is obtained to further analyze device behavior. As an example, the other data may be failed or suspicious SQL queries by the device on one or more computing systems of the vehicle, file transfers from the device, any failed, secured login attempts by the device, attempts to tamper with any media content, Internet traffic using the inflight entertainment system and other data types.

In block B410, the first parameter and the second parameter are analyzed and correlated by the correlation engine 308. If the analysis determines that a second threshold value (326) has been breached, then an incident is declared. The severity level of the event will depend on the event type.

The following provides an example of some incidents that may be detected and declared in an aircraft: unauthorized access to any LRU of the IFE, unrecognized login credentials, authentication or validation failures for a LRU (for example, an unknown username, wrong password, bad certification and others); ignoring a load authentication error; attempted access from an aircraft seat to blocked destinations; LRU system file checksum errors which need a new download (this is to prevent modification of code or startups scripts in a flash memory device); new encryption/decryption keys; username and/or process name for application log on/off events (for example, flight crew and aircraft maintenance); decryption of secured content; unsuccessful VPN (virtual private network) logins; successful logins; credit card transaction information without account name, account number and personal identification number; root or command access during a flight per LRU; and errors (for example, permission denied or command not found). These examples are intended to show the adaptive aspects of the present disclosure and not limit the disclosure.

In block B412, information regarding the event is provided to the user. The user in this context may be an airline administrator or any other entity, including law enforcement. The event information is based on the security breach, for example, a critical breach may result in a text alert or a phone call, while moderate breach details may be sent via a scheduled report.

GUI Screenshot: FIG. 4B shows an example of a screenshot displayed at a user console that tracks a plurality of vehicles, according to one aspect of the present disclosure. The screen shot 414 may be provided by the report module 314 of the management console 306 or any other computing device. The screenshot 414, as an example, may be used by an airline, but may be customized for other environments, for example, a console monitoring trains, buses, trucks and other vehicle types, including Uber drivers (without derogation of any third party trademark rights).

Screenshot 414 includes a segment 416 to provide a summary of the number of aircrafts that are being monitored at any given time. Segment 418 provides a total number of events for an airline. Segment 420 provides an average number of errors per aircraft. The total number of incidents are shown in segment 422, while segment 424 provides a list of aircrafts with the highest number of errors. Segment 426 provides an error count for LRUs with the device names. Segment 428 shows the listing of aircrafts with audited events. The top audit events are shown in segment 430. The term audit means events that are processed using the process flow of FIG. 4A described above.

In one aspect, the methods and systems described above have advantages. Because networked devices and user device behavior is monitored, one is able to identify a potential security breach and take proactive action to minimize the impact of the breach.

Figure 5:
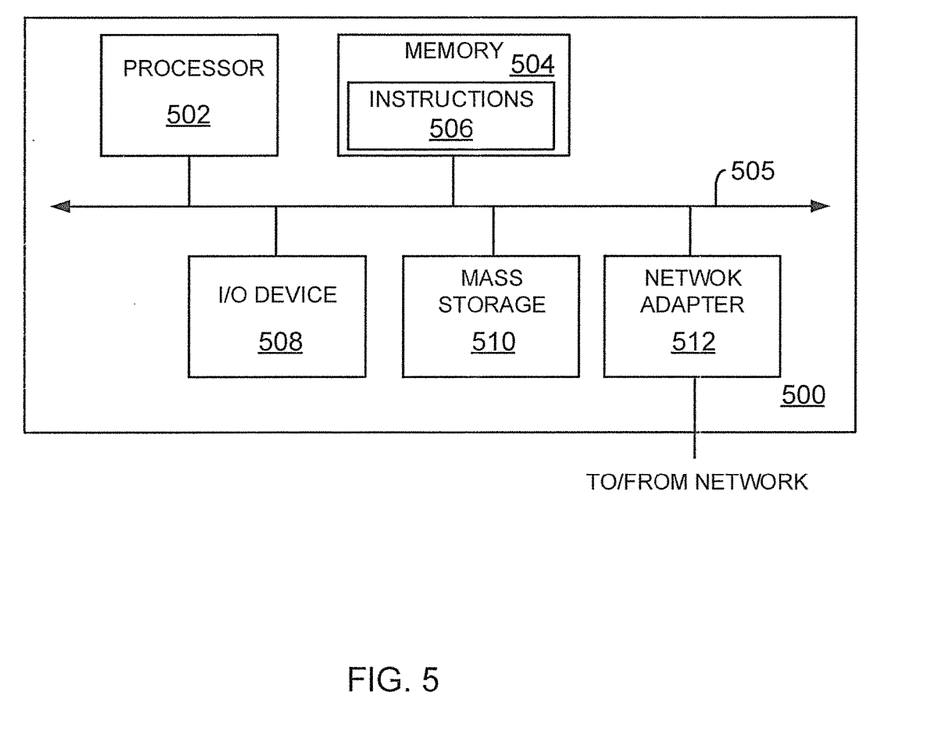
FIG. 5 shows an example of a hardware based, processing system, according to one aspect of the present disclosure.

Processing System: FIG. 5 is a high-level block diagram showing an example of the architecture of a processing system 500 that may be used according to one aspect. The processing system 500 can represent media server system 112, computing system 106, user interface system 114, vehicle computing device 304, management console 306 or any user device that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIG. 4A described above as well as the logic used by the correlation engine 308. Memory 504 may also be used to store the correlation data structure 316, described above in detail.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks.

The network adapter 512 provides the processing system 500 with the ability to communicate with remote devices (e.g., over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Thus, a method and apparatus for monitoring devices on a vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
monitoring for detecting a potential security breach, a first set of networked devices located on a transportation vehicle and a second set of user devices that are controlled by users of the transportation vehicle;
detecting that a first parameter has reached a first threshold value indicating a suspicious behavior by a user device;
obtaining at least a second parameter associated with the user device and the first parameter, based on detecting that the first parameter has reached the first threshold value;
correlating the first parameter and the second parameter to declare a security related event when the second parameter has reached a second threshold value associated with the second parameter; and
providing an alert for the security related event and a summary of security related events that have reached the first threshold value and the second threshold value; wherein an alert level for the security event varies based on a type of the security related event.

2. The method of claim 1, wherein the transportation vehicle is an aircraft and the first set of network devices are part of an in-flight entertainment system.

3. The method of claim 2, wherein the first parameter indicates an attempt by the user device to port scan any of the first set of networked devices.

4. The method of claim 2, wherein the second parameter is a failed query for a data structure stored by one of the first set of network devices.

5. The method of claim 2, wherein the second parameter is based on data transfer by the user device and any other device.

6. The method of claim 2, wherein the second parameter is based on an attempt to upload unauthorized content using the in-flight entertainment system.

7. The method of claim 1, wherein the transportation vehicle is one of an automobile, a bus, a train and a recreational vehicle (RV).

8. A non-transitory, machine readable medium having stored thereon instructions comprising machine executable code which when executed by a machine, causes the machine to:

monitor for detecting a potential security breach, a first set of networked devices located on a transportation vehicle and a second set of user devices that are controlled by users of the transportation vehicle;

detect that a first parameter has reached a first threshold value indicating a suspicious behavior by a user device;

obtain at least a second parameter associated with the user device and the first parameter, based on detecting that the first parameter has reached the first threshold value;

correlate the first parameter and the second parameter to declare a security related event when the second parameter has reached a second threshold value associated with the second parameter; and provide an alert for the security related event and a summary of security related events that have reached the first threshold value and the second threshold value; wherein an alert level for the security event varies based on a type of the security related event.

9. The non-transitory, machine readable medium of claim 8, wherein the transportation vehicle is an aircraft and the first set of network devices are part of an in-flight entertainment system.

10. The non-transitory, machine readable medium of claim 9, wherein the first parameter indicates an attempt by the user device to port scan any of the first set of networked devices.

11. The non-transitory, machine readable medium of claim 9, wherein the second parameter is a failed query for a data structure stored by one of the first set of network devices.

12. The non-transitory, machine readable medium of claim 9, wherein the second parameter is based on data transfer by the user device and any other device.

13. The non-transitory, machine readable medium of claim 9, wherein the second parameter is based on an attempt to upload unauthorized content using the in-flight entertainment system.

14. The non-transitory, machine readable medium of claim 8, wherein the transportation vehicle is one of an automobile, a bus, a train and a recreational vehicle (RV).

15. A system, comprising:
a memory containing machine readable medium comprising machine executable code having stored thereon instructions; and a processor module coupled to the memory, the processor module configured to execute the machine executable code to:

monitor for detecting a potential security breach, a first set of networked devices located on a transportation vehicle and a second set of user devices that are controlled by users of the transportation vehicle;

detect that a first parameter has reached a first threshold value indicating a suspicious behavior by a user device;

obtain at least a second parameter associated with the user device and the first parameter , based on detecting that the first parameter has reached the first threshold value;

correlate the first parameter and the second parameter to declare a security related event when the second parameter has reached a second threshold value associated with the second parameter; and provide an alert for the security related event and a summary of security related events that have reached the first threshold value and the second threshold value; wherein an alert level for the security event varies based on a type of the security related event.

16. The system of claim 15, wherein the transportation vehicle is an aircraft and the first set of network devices are part of an in-flight entertainment system.

17. The system of claim 16, wherein the first parameter indicates an attempt by the user device to port scan any of the first set of networked devices.

18. The system of claim 16, wherein the second parameter is a failed query for a data structure stored by one of the first set of network devices.

19. The system of claim 16, wherein the second parameter is based on data transfer by the user device and any other device.

20. The system of claim 16, wherein the second parameter is based on an attempt to upload unauthorized content using the in-flight entertainment system.

21. The system of claim 15, wherein the transportation vehicle is one of an automobile, a bus, a train and a recreational vehicle (RV).

* * * * *

UNITED STATES PATENT AND TRADEMARK OFFICE
CERTIFICATE OF CORRECTION

PATENT NO. : 9,813,911 B2  
APPLICATION NO. : 14/962425  
DATED : November 7, 2017  
INVENTOR(S) : Kong et al.

Page 1 of 1

It is certified that error appears in the above-identified patent and that said Letters Patent is hereby corrected as shown below:

On the Title Page

Item (72), Column 1, Line 8, delete "Phillip" and insert -- Philip --, therefor.

Signed and Sealed this  
Third Day of April, 2018

Andrei Iancu  
*Director of the United States Patent and Trademark Office*